(12) United States Patent
Nidamanuri et al.

(10) Patent No.: US 10,210,520 B2
(45) Date of Patent: Feb. 19, 2019

(54) CO-PROCESSING ELECTRONIC SIGNALS FOR REDUNDANCY

(71) Applicant: MasterCard International Incorporated, Purchase, NY (US)

(72) Inventors: Srinivasarao Nidamanuri, Chesterfield, MO (US); Daryl Hurt, Wentzville, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 812 days.

(21) Appl. No.: 14/796,244

(22) Filed: Jul. 10, 2015

(65) Prior Publication Data

US 2017/0011403 A1 Jan. 12, 2017

(51) Int. Cl.
*G06Q 20/40* (2012.01)
*G06Q 20/10* (2012.01)

(52) U.S. Cl.
CPC ....... *G06Q 20/4016* (2013.01); *G06Q 20/108* (2013.01); *G06Q 20/405* (2013.01)

(58) Field of Classification Search
CPC .. G06Q 20/40; G06Q 20/3674; G06Q 20/401; G06Q 30/0225; G06Q 20/4016
USPC ..................................................... 705/35–45
See application file for complete search history.

(56) References Cited

U.S. PATENT DOCUMENTS

| | | | |
|---|---|---|---|
| 5,805,686 A | 9/1998 | Moller et al. | |
| 5,819,226 A | 10/1998 | Gopinathan et al. | |
| 6,254,000 B1 | 7/2001 | Degen et al. | |
| 7,562,814 B1 | 7/2009 | Shao et al. | |
| 7,940,899 B2 | 5/2011 | Moorman, III et al. | |
| 8,103,543 B1 | 1/2012 | Zwicky | |
| 8,386,377 B1 | 2/2013 | Xiong et al. | |
| 8,650,080 B2 | 2/2014 | O'Connell et al. | |
| 8,655,724 B2 | 2/2014 | Chow et al. | |
| 8,666,588 B2 | 3/2014 | Geilen et al. | |
| 8,666,841 B1 | 3/2014 | Claridge et al. | |
| 2004/0133622 A1 | 7/2004 | Clubb et al. | |
| 2007/0214085 A1 | 9/2007 | Degen et al. | |
| 2010/0125470 A1* | 5/2010 | Chisholm .............. | G06Q 20/04 705/35 |
| 2012/0047583 A1 | 2/2012 | Nyemahame et al. | |
| 2014/0351137 A1* | 11/2014 | Chisholm .............. | G06Q 20/04 705/44 |

FOREIGN PATENT DOCUMENTS

| | | |
|---|---|---|
| JP | 2004524599 A | 8/2004 |
| JP | 2008262601 A | 10/2008 |
| KR | 1020110139739 A | 12/2011 |
| WO | 02069561 A2 | 9/2002 |

OTHER PUBLICATIONS

PCT Search Report and Written Opinion, Application No. PCT/US2016/041515, dated Oct. 18, 2016, 8 pps.
Korean Office Action, Application No. 10-2018-7000584, dated Nov. 19, 2018, 7 pps.

* cited by examiner

*Primary Examiner* — Hao Fu
(74) *Attorney, Agent, or Firm* — Armstrong Teasdale LLP (57) ABSTRACT

A co-processing fraud risk scoring system for scoring electronic payment transactions for potential fraud is described. Additionally, a method and a computer-readable storage medium for scoring electronic payment transactions for potential fraud are described.

20 Claims, 9 Drawing Sheets

CO-PROCESSING ELECTRONIC SIGNALS FOR REDUNDANCY

BACKGROUND

This disclosure relates to processing electronic signals transmitted through computer networks, and more specifically to calculating fraud scores associated with electronic transaction signals using co-processing to provide redundancy.

At least some known payment processing networks for processing financial transactions among parties use a fraud scoring system. Such fraud scoring systems compare data associated with an electronic transaction to one or more predefined rules to determine whether the electronic transaction is fraudulent (e.g., an attempted purchase made by someone other than the account holder). When such fraud scoring systems become inoperable, for example when maintenance is being performed, the payment processing network experiences an interruption in its ability to quickly determine whether an electronic transaction is likely fraudulent.

BRIEF DESCRIPTION OF THE DISCLOSURE

In one aspect, a fraud risk scoring system for scoring electronic payment transactions for potential fraud is provided. The fraud risk scoring system includes a message processor computing device in communication with a payment network, a first scoring computing device coupled to the message processor computing device, and a second scoring computing device coupled to the message processor computing device. The fraud risk scoring system is configured to receive a first authorization request message for a first payment transaction. The fraud risk scoring system is additionally configured to determine that the first authorization request message includes a first cardholder account number that includes an odd numbered bank identification number, transmit the first authorization request message to the first scoring computing device to generate a first fraud risk score for the first authorization request message based on a first set of rules stored by a first database and a first profile associated with the first cardholder account, receive a second authorization request message for a second payment transaction, determine that the second authorization request message includes a second cardholder account number that includes an even numbered bank identification number, and transmit the second authorization request message to the second scoring computing device to generate a second fraud risk score for the second authorization request message, based on a second set of rules stored by a second database and a second profile associated with the second cardholder account.

In another aspect, a method for scoring electronic payment transactions for potential fraud is provided. The method is implemented by a fraud risk scoring system that includes a message processor computing device in communication with a payment network, a first scoring computing device coupled to the message processor computing device, and a second scoring computing device coupled to the message processor computing device. The method includes receiving, by the fraud risk scoring system, a first authorization request message for a first payment transaction. The method additionally includes determining, by the fraud risk scoring system, that the first authorization request message includes a first cardholder account number that includes an odd numbered bank identification number, transmitting, by the fraud risk scoring system, the first authorization request message to the first scoring computing device to generate a first fraud risk score for the first authorization request message based on a first set of rules stored by a first database and a first profile associated with the first cardholder account, receiving, by the fraud risk scoring system, a second authorization request message for a second payment transaction, determining, by the fraud risk scoring system, that the second authorization request message includes a second cardholder account number that includes an even numbered bank identification number, and transmitting, by the fraud risk scoring system, the second authorization request message to the second scoring computing device to generate a second fraud risk score for the second authorization request message, based on a second set of rules stored by a second database and a second profile associated with the second cardholder account.

In yet another aspect, a computer-readable storage medium having computer-executable instructions embodied thereon is provided. When executed by a one or more processors of a fraud risk scoring system that includes a message processor computing device in communication with a payment network, a first scoring computing device coupled to the message processor computing device, and a second scoring computing device coupled to the message processor computing device, the computer-executable instructions cause the fraud risk scoring system to: receive a first authorization request message for a first payment transaction, determine that the first authorization request message includes a first cardholder account number that includes an odd numbered bank identification number, transmit the first authorization request message to the first scoring computing device to generate a first fraud risk score for the first authorization request message based on a first set of rules stored by a first database and a first profile associated with the first cardholder account, receive a second authorization request message for a second payment transaction, determine that the second authorization request message includes a second cardholder account number that includes an even numbered bank identification number, and transmit the second authorization request message to the second scoring computing device to generate a second fraud risk score for the second authorization request message, based on a second set of rules stored by a second database and a second profile associated with the second cardholder account.

BRIEF DESCRIPTION OF THE DRAWINGS

FIGS. 1-9 show example embodiments of the methods and systems described herein.

DETAILED DESCRIPTION OF THE DISCLOSURE

The system described herein includes a fraud risk scoring system for scoring electronic payment transactions for potential fraud. In particular, the fraud risk scoring system uses distributed processing to eliminate interruptions in determining whether electronic payment transactions are fraudulent. The fraud risk scoring system includes a message processor computing device in communication with a payment network. The fraud risk scoring system also includes a first scoring computing device coupled to the payment network and a second scoring computing device coupled to the payment network. The fraud risk scoring system is configured to receive a first authorization request message for a first payment transaction. Additionally, the fraud risk scoring system determines that the first authorization request message includes a first cardholder account number that includes an odd numbered bank identification number (BIN). The fraud risk scoring system transmits the first authorization request message to the first scoring computing device to generate a first fraud risk score for the first authorization request message based on a first set of rules stored by a first database and a first profile associated with the first cardholder account. Additionally, the fraud risk scoring system receives a second authorization request message for a second payment transaction. Further, the fraud risk scoring system determines that the second authorization request message includes a second cardholder account number that includes an even number bank identification number. The fraud risk scoring system transmits the second authorization request message to the second scoring computing device to generate a second fraud risk score for the second authorization request message, based on a second set of rules stored by a second database and a second profile associated with the second cardholder account.

In some implementations, the fraud scoring system is further configured to generate, by the first scoring computing device, a first profile update request message to update the first profile associated with the first cardholder account. Additionally, the fraud scoring system transmits the first profile update request message to the second scoring computing device. Further the fraud scoring system generates, by the second scoring computing device, a second profile update request message to update the second profile associated with the second cardholder account and transmits the profile update request message to the first scoring computing device.

In some implementations, the fraud risk scoring system determines that the first scoring computing device is not operating, and performs a fallback process. Specifically, the fraud risk scoring system terminates any processes for replicating data between the first database and the second database. Additionally, the fraud risk scoring system generates profile update request messages associated with both odd and even numbered bank identification numbers at the second scoring computing device and stores the profile update request messages for processing by the first scoring computing device when the first scoring computing device is operational. Subsequently, the fraud risk scoring system determines that the first scoring computing device is operational and transmits all stored profile update request messages from the second scoring computing device to the first scoring computing device. Additionally, the fraud risk scoring system synchronizes the second set of rules stored in the second database with the first set of rules stored in the first database.

In some implementations, the authorization request messages are real time or near real time authorization request messages. Additionally, in some implementations, the fraud risk scoring system is configured to generate, by the first scoring computing device and the second scoring computing device, authorization response messages for each respective authorization request message received. Additionally, the fraud risk scoring system updates the corresponding cardholder profiles based on the authorization request messages, and stores the updated cardholder profiles in the first database and the second database.

In at least some implementations, the first scoring computing device and the second scoring computing device update the cardholder profiles in response to profile update request messages without storing the profile update request messages in the first database or the second database. Additionally, in some implementations, the fraud scoring system receives cardholder demographics and nonmonetary data at the first scoring computing device and the second scoring computing device, and updates cardholder profiles using the received cardholder demographics and nonmonetary data.

The fraud risk scoring system, in some implementations, synchronizes rules between the first database and the second database by determining that the first rules stored in the first database do not match the second rules stored in the second database, and synchronizes the first rules with the second rules. Additionally, in some implementations, the fraud risk scoring system is configured to replicate data between the first database and the second database at a predefined interval (e.g., once per day, once per hour, once per minute, or once per second).

More specifically, the present disclosure provides an architecture that provides high availability for a fraud risk scoring system ("fraud detection system") using distributed processing (e.g., co-processing). An authorization system (B24) transmits transactions to primary and secondary sites of the fraud risk scoring system as follows. The authorization system transmits both real time (101) and near real time (102) transactions that pertain to cardholder accounts with odd bank identification numbers ("BINs") to a scoring engine of the primary site. The scoring engine of the primary site also receives profile update (108) transactions for cardholder accounts with even BINs. The authorization system transmits transactions for cardholder accounts with even BINs to a secondary scoring engine at the secondary site. The secondary scoring engine receives both real time (101) and near real time (102) transactions for cardholder accounts having even BINs. The scoring engine at the secondary site additionally receives profile update (108) transactions for cardholder accounts with odd BINs. The fraud risk scoring system processes profile update transactions and updates the cardholder profiles only. The updates are not written to a database at this point. This ensures that cardholder profiles are up to date on both sites. Additionally, the fraud risk scoring system processes 101/102 transactions and sends corresponding authorization responses to the payment network 128, and will update the cardholder profiles and database for case creation. Cardholder demographics and non-monetary information is delivered to both the primary and secondary sites to update cardholder demographic information. In order to support case management, system data is available in both the primary site and the secondary site. For case management, both the primary and secondary sites are available, but processing only happens from one site, and the other site will be in hot standby mode. Replication between databases is bi-directional and operates within sub-second time. A rule replicator process continuously monitors rule repositories for changes. If there are any changes to the rules, the rule replicator replicates the rules to the opposite site and simulates rule deployment to synchronize the rule deployment.

In case of a failover from the primary site to the secondary site due to any infrastructure maintenance, the following process is performed. First, authorization transaction traffic is stopped at the primary site. Second, the fraud risk scoring server, a case manager, and an expert application are stopped at the primary site. Next, database replication from the secondary site to the primary site is stopped. Additionally, all data from the primary site database is replicated to the secondary site database. Once all data is replicated from the primary site to the secondary site, bi-directional replication is stopped. Next, all odd BIN transactions are routed to the secondary site. At this point in time, the secondary site will be running and it will receive all odd BIN transactions that were rerouted from the primary site. Next, odd and even BIN profile update transactions are generated to update profiles on the primary site. These messages are on hold until the primary site is available for processing. Additionally, web applications receive HTTP requests from the secondary site to work on cases and to deploy rules. Once the primary site maintenance is complete, all profile update transactions are released to update primary site profiles. Once the profiles are updated, the system confirms that the rules are current from the secondary site. Once the above process is complete, the primary site is available to normalize traffic. Using the above operational failover process, the fraud risk scoring system is highly available without any outage during any maintenance.

The methods and systems described herein may be implemented using computer programming or engineering techniques including computer software, firmware, hardware or any combination or subset thereof, wherein the technical effect is achieved by performing at least one of: (a) receiving a first authorization request message for a first payment transaction; (b) determining that the first authorization request message includes a first cardholder account number that includes an odd numbered bank identification number; (c) transmitting the first authorization request message to the first scoring computing device to generate a first fraud risk score for the first authorization request message based on a first set of rules stored by a first database and a first profile associated with the first cardholder account; (d) receiving a second authorization request message for a second payment transaction; (e) determining that the second authorization request message includes a second cardholder account number that includes an even numbered bank identification number; and (f) transmitting the second authorization request message to the second scoring computing device to generate a second fraud risk score for the second authorization request message, based on a second set of rules stored by a second database and a second profile associated with the second cardholder account. The technical effects described herein apply to the technical field of processing electronic signals transmitted through a computer network using distributed processing.

The systems and methods described herein provide the technical advantage of enabling an electronic payment processing network to provide highly robust and failure tolerant fraud scoring of electronic payment transaction signals to enable the payment processing network to determine whether a particular payment transaction is fraudulent while the transaction is being processed, rather than after a payment purchase has already been completed. More specifically, the systems and methods described herein enable the payment network to perform such fraud scoring even while maintenance is being performed on the fraud scoring system. By enabling such highly reliable and robust fraud scoring, the systems and methods described herein enable a payment network infrastructure to operate more efficiently, by reducing the amount of additional transactions that would otherwise need to be transmitted and processed in order to correct (e.g., apply adjustments to) payment transactions that should have been declined due to fraud.

In situations in which the systems discussed herein collect personal information about users, or may make use of personal information, the users may be provided with an opportunity to control whether programs or features collect user information. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as a city, a ZIP code, or state level), so that a particular location of a user cannot be determined. Thus, the user may have control over how information is collected about the user and used by the systems.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1:
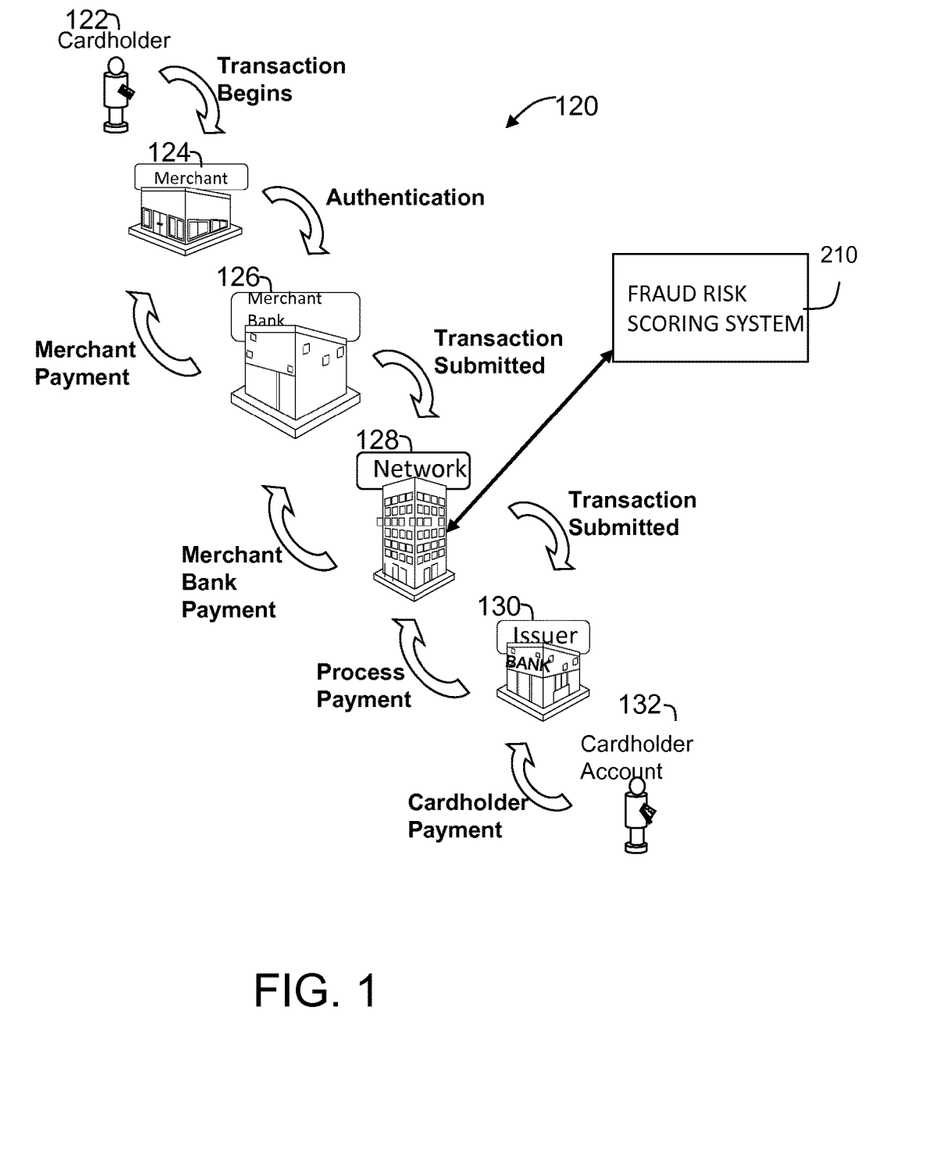
FIG. 1 is a schematic diagram illustrating an example multi-party payment card industry system for enabling payment-by-card transactions in which merchants and card issuers do not necessarily have a one-to-one relationship.

FIG. 1 is a schematic diagram illustrating an example multi-party payment card system 120 for enabling payment-by-card transactions in which merchants and card issuers do not necessarily have a one-to-one relationship. The present disclosure relates to payment card system 120, such as a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 120, a financial institution such as an issuer 130 issues a payment account card, such as a credit card account or a debit card account, to a cardholder 122, who uses the payment account card to tender payment for a purchase from a merchant 124. To accept payment with the payment account card, merchant 124 must normally establish an account with a financial institution that is part of the financial payment system. This financial institution is usually called the "merchant bank" or the "acquiring bank" or "acquirer bank" or simply "acquirer". When a cardholder 122 tenders payment for a purchase with a payment account card (also known as a financial transaction card), merchant 124 requests authorization from acquirer 126 for the amount of the purchase. The request may be performed over the telephone, but is usually performed through the use of a point-of-interaction terminal, which reads the cardholder's account information from the magnetic stripe on the payment account card or EMV chip and communicates electronically with the transaction processing computers of acquirer 126. Alternatively, acquirer 126 may authorize a third party to perform transaction processing on its behalf. In this case, the point-of-interaction terminal will be configured to communicate with the third party. Such a third party is usually called a "merchant processor" or an "acquiring processor." In some instances, a merchant (e.g., merchant 124) stores payment card information associated with a cardholder (e.g., cardholder 122) and requests authorization from acquirer 126 using the stored payment card information, rather than reading the cardholder's account information from the payment card itself (i.e., a card-on-file (COF) transaction).

In some implementations, the computer systems of the payment network 128 communicate with a fraud risk scoring system 210, which may include multiple sites, each with respective scoring engines, as described in more detail herein. The fraud risk scoring system 210 receives the authorization request message from the computers of the payment network 128 and applies one or more rules to determine whether the likelihood that the transaction is fraudulent (e.g., a fraud risk score). More specifically, the fraud risk scoring system 210 calculates the fraud risk score based on a profile of the cardholder, transaction history, spending patterns, the location of the purchase, the time of the purchase, the amount of the purchase, and/or other factors. The fraud risk scoring system 210 then transmits the fraud risk score to the computers of the payment network 128. Based on the fraud risk score, the computers of the payment network 128 may decline the transaction without ever transmitting the authorization request message to the issuer 130, or may transmit the authorization request message to the issuer 130 with the fraud risk score.

More specifically, in the latter case, using payment card system payment network 128, the computers of acquirer 126 or the merchant processor will communicate with the computers of issuer 130, to determine whether the cardholder's account 132 is in good standing and whether the purchase is covered by the cardholder's available credit line or account balance. Based on these determinations, the request for authorization will be declined or accepted. If the request is accepted, an authorization code is issued to merchant 124.

When a request for authorization is accepted, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For PIN debit card transactions, when a request for authorization is approved by the issuer, the cardholder's account 132 is decreased. Normally, a charge is posted immediately to cardholder's account 132. The bankcard association then transmits the approval to the acquiring processor for distribution of goods/services, or information or cash in the case of an ATM.

After a transaction is captured, the transaction is cleared and settled between merchant 124, acquirer 126, and issuer 130. Clearing refers to the communication of financial data for reconciliation purposes between the parties. Settlement refers to the transfer of funds between the merchant's account, acquirer 126, and issuer 130 related to the transaction.

Figure 2:
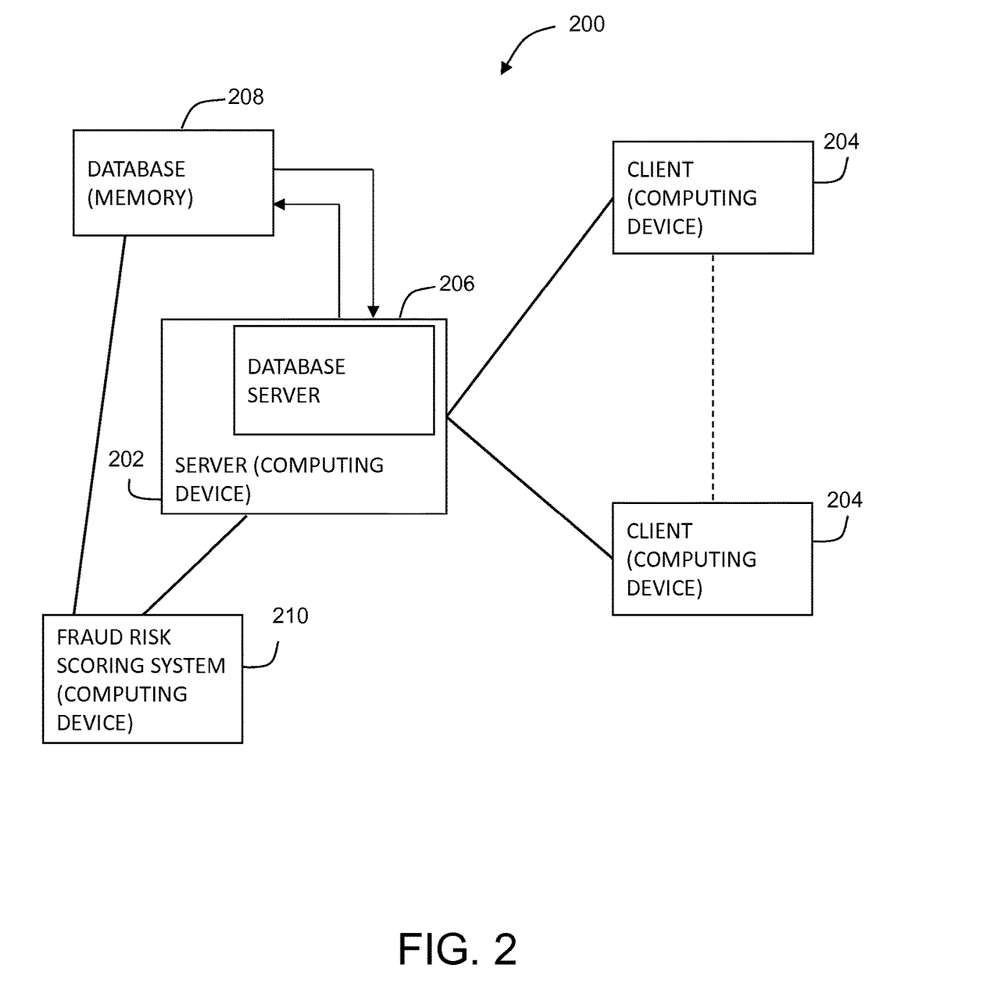
FIG. 2 is a simplified block diagram of an example payment processing system including a payment processing server computing device, a fraud risk scoring computing device, and a plurality of computing devices in accordance with one example embodiment of the present disclosure.

FIG. 2 is a simplified block diagram of an example payment processing system 200 in accordance with one embodiment of the present disclosure. In the example embodiment, system 200 includes a payment processing server computing device 202, a plurality of client subsystems, also referred to as client systems 204 or client computing devices, connected to payment processing server computing device 202, and a fraud risk scoring server 210, also referred to herein as a fraud risk scoring system. In one embodiment, client systems 204 are computers including a web browser, such that payment processing server computing device 202 is accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a mobile computing device, such as a notebook computer, a web-based phone, a personal digital assistant (PDA), or other web-connectable equipment. In one embodiment, client computing device 204 includes a point-of-sale (POS) device, a cardholder computing device (e.g., a smartphone, a tablet, or other computing device), or any other computing device capable of communicating with payment processing server computing device 202. A database server 206 is connected to a database 208 containing information on a variety of matters, as described below in greater detail. In one embodiment database 208 is stored on payment processing server computing device 202 and may be accessed by potential users at one of client systems 204 by logging onto payment processing server computing device 202 through one of client systems 204. In any alternative embodiment, database 208 is stored remotely from payment processing server computing device 202 and may be non-centralized.

Figure 3:
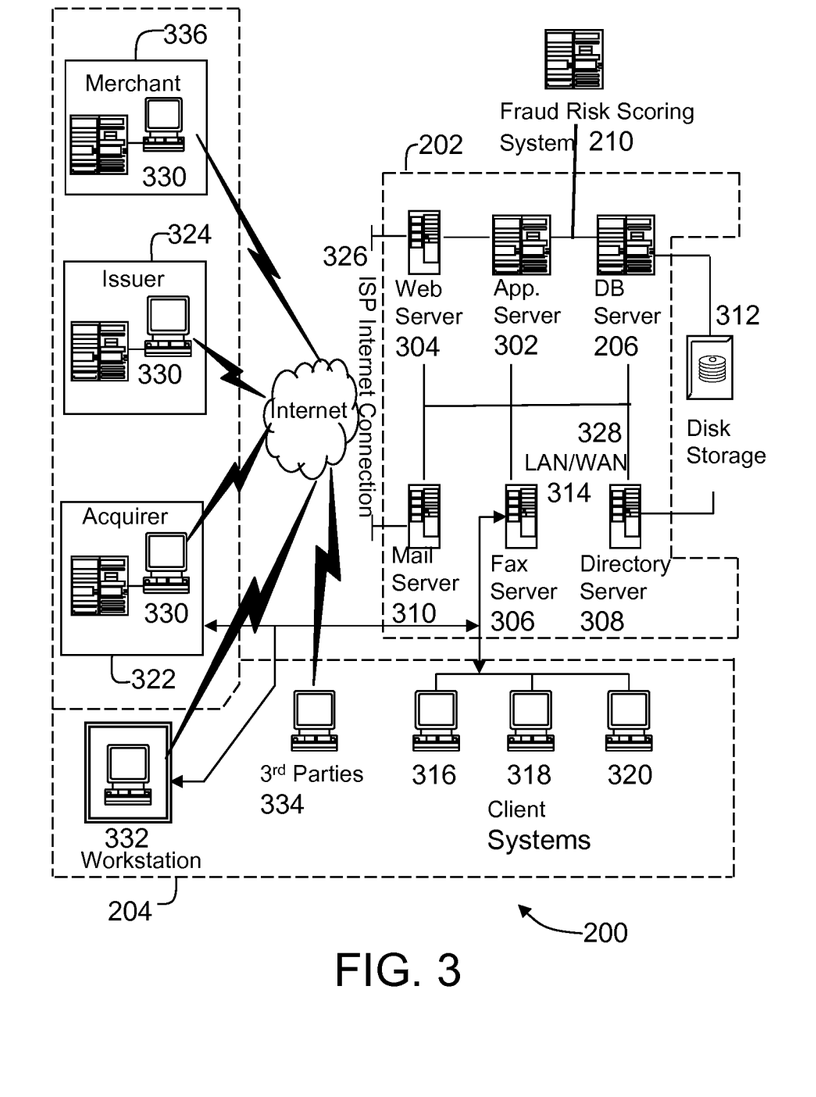
FIG. 3 is an expanded block diagram of a server architecture of the payment processing system including the plurality of computing devices in accordance with one example embodiment of the present disclosure.

FIG. 3 is an expanded block diagram of an example embodiment of a server architecture of payment processing system 200 in accordance with one embodiment of the present disclosure. Payment processing system 200 includes payment processing server computing device 202, client systems 204, and fraud risk scoring server 210. Payment processing server computing device 202 includes database server 206, an application server 302, a web server 304, a fax server 306, a directory server 308, and a mail server 310. A disk storage unit 312 is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet. In some implementations, fraud risk scoring server 210 is remote from payment processing server computing device 202 but communicatively coupled thereto. In other implementations, fraud risk scoring server 210 is incorporated into payment processing server computing device 202.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Payment processing server computing device 202 is configured to be communicatively coupled to various entities, including acquirers 322 and issuers 324, and to third parties 334 (e.g., auditors) using an Internet connection 326. Server system 202 is also communicatively coupled with one or more merchants 336. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328. As described above, in some implementations, fraud risk scoring server 210 is remote from payment processing server computing device 202 but communicatively coupled thereto. In other implementations, fraud risk scoring server 210 is incorporated into payment processing server computing device 202.

In the example embodiment, any authorized individual or entity having a workstation 330 may access system 200. At least one of the client systems includes a manager workstation 332 located at a remote location. Workstations 330 and 332 include personal computers having a web browser. Furthermore, fax server 306 communicates with remotely located client systems, including a client system 332, using a telephone link. Fax server 306 is configured to communicate with other client systems 316, 318, and 320 as well.

Figure 4:
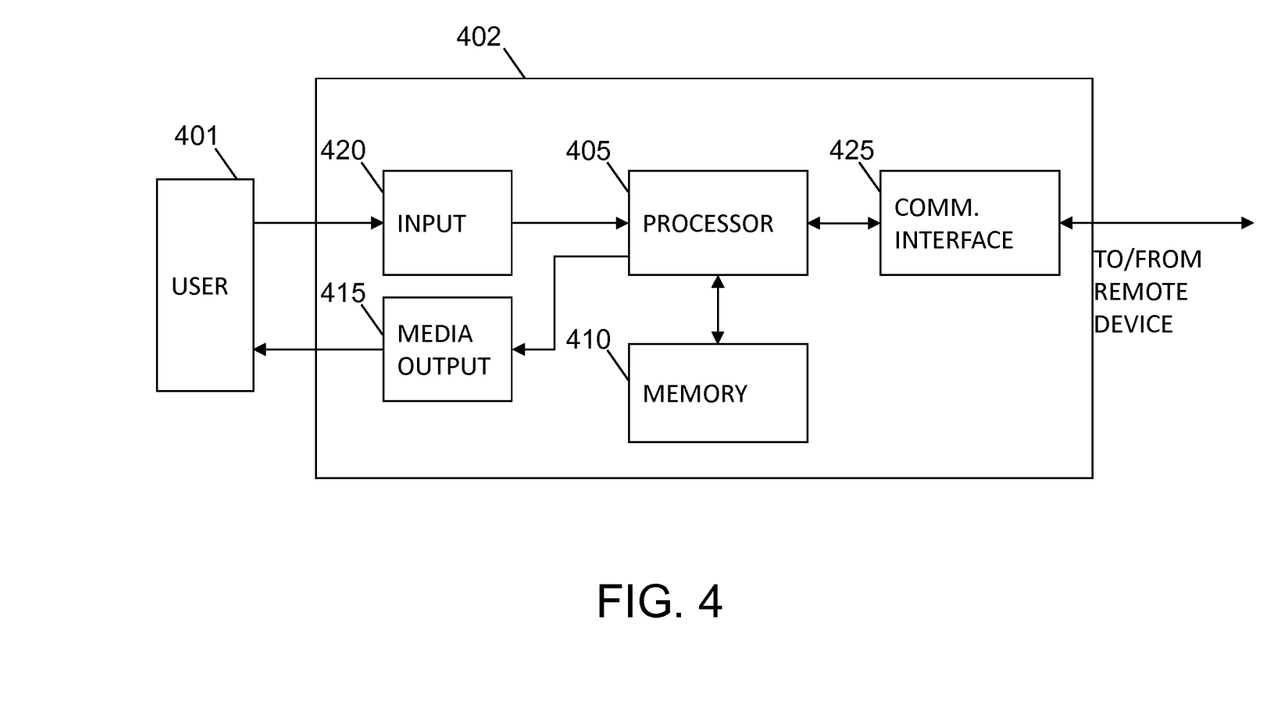
FIG. 4 illustrates a configuration of a client system shown in FIGS. 2 and 3 in accordance with one example embodiment of the present disclosure.

FIG. 4 illustrates an example configuration of a client computing device 402. Client computing device 402 may include, but is not limited to, client systems ("client computing devices") 204, 316, 318, and 320, workstation 330, manager workstation 332, and third party computing devices 334 (shown in FIG. 3).

Client computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Client computing device 402 also includes at least one media output component 415 for presenting information to a user 401 (e.g., a cardholder 122). Media output component 415 is any component capable of conveying information to user 401. In some embodiments, media output component 415 includes an output adapter such as a video adapter and/or an audio adapter. An output adapter is operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Client computing device 402 may also include a communication interface 425, which is communicatively coupleable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users 401 to display and interact with media and other information typically embedded on a web page or a website from a web server associated with a merchant. A client application allows users 401 to interact with a server application associated with, for example, a merchant.

Figure 5:
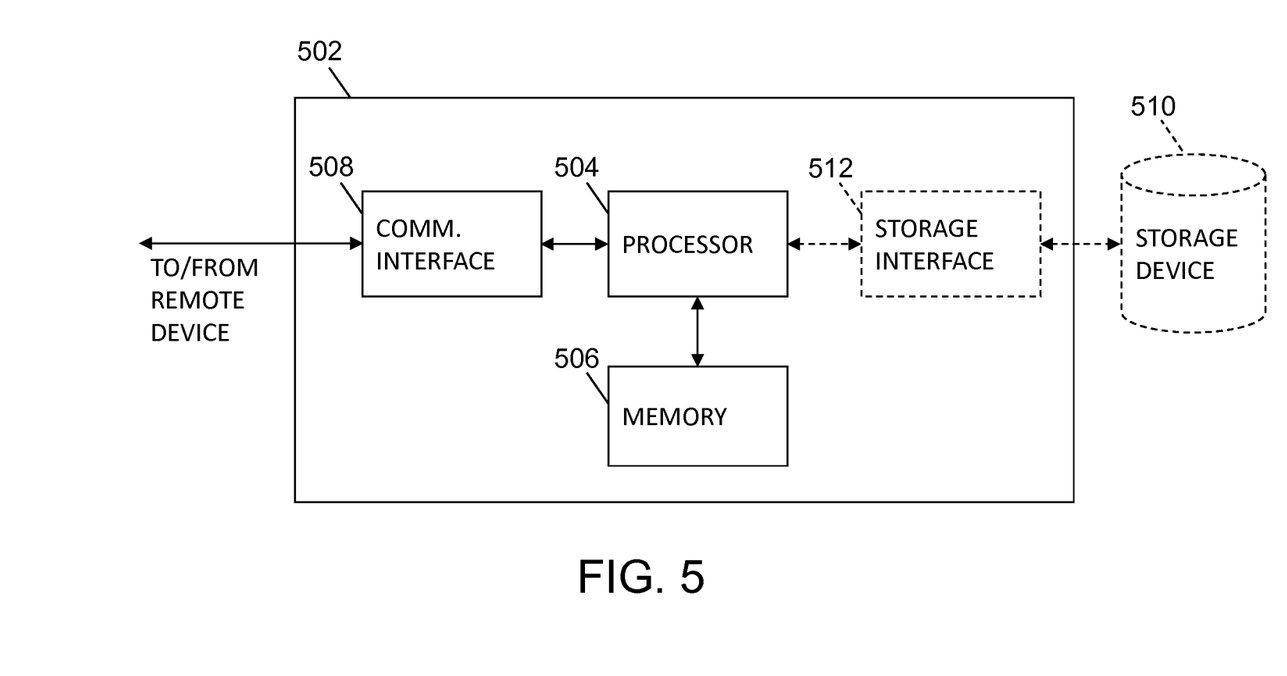
FIG. 5 illustrates a configuration of a server system shown in FIGS. 2 and 3 in accordance with one example embodiment of the present disclosure.

FIG. 5 illustrates an example configuration of a server computing device 502. Server computing device 502 is representative of payment processing server computing device 202 (shown in FIGS. 2 and 3), database server 206, application server 302, web server 304, fax server 306, directory server 308, mail server 310, and one or more computing devices included in fraud risk scoring server 210.

Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as client computing device 402 or another server computing device 502. For example, communication interface 508 may receive requests from client systems 204 via the Internet, as illustrated in FIGS. 2 and 3.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
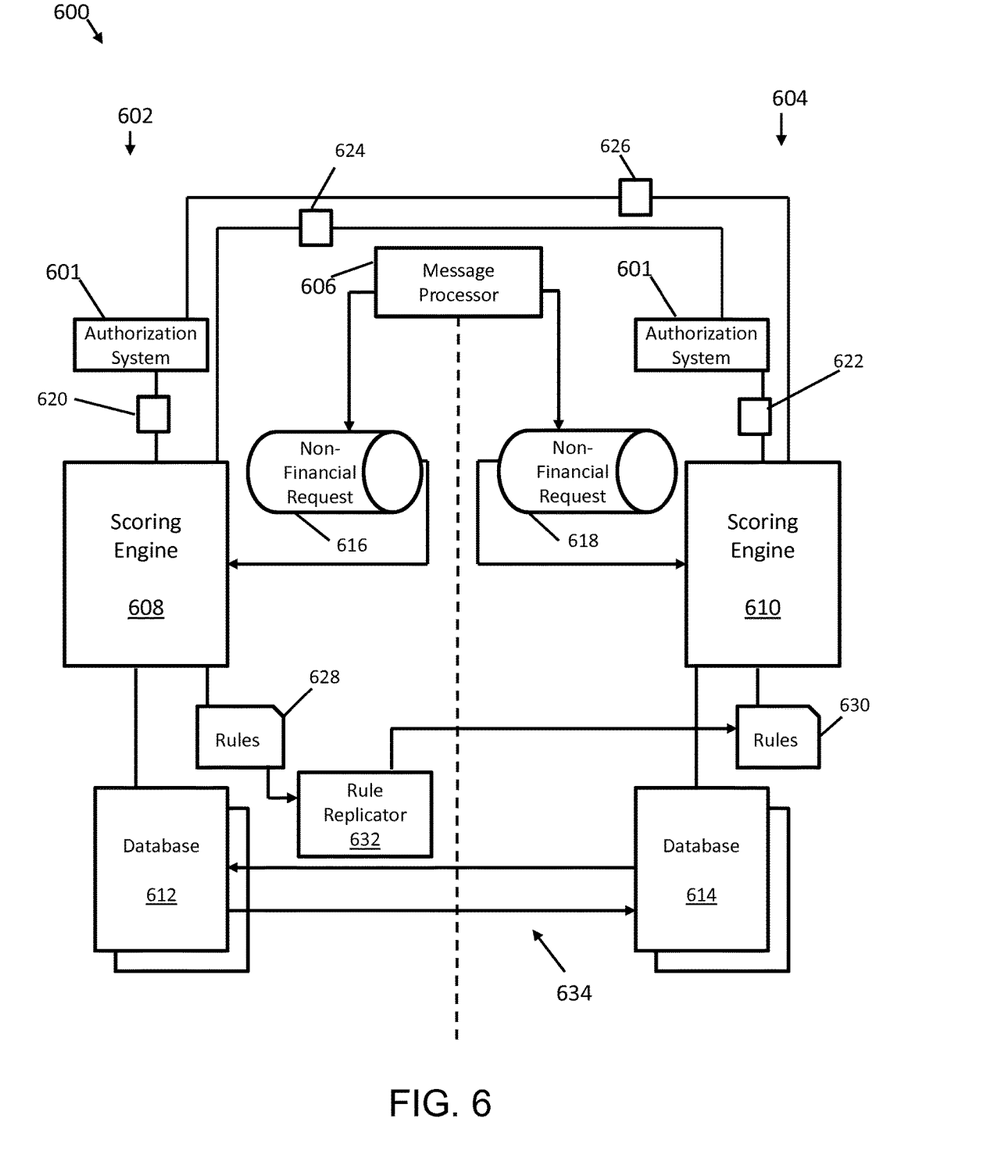
FIG. 6 is a data flow diagram for the routing and storage of data by the fraud risk scoring server in accordance with an example embodiment of the present disclosure.

FIG. 6 is a data flow diagram 600 for the routing and storage of data by fraud risk scoring server 210. Fraud risk scoring server 210 includes a first ("primary") site 602 and a second ("secondary") site 604. Additionally, in at least some implementations, fraud risk scoring server 210 includes an authorization system 601 which directs first transaction messages 620 (e.g., authorization request messages) that pertain to cardholder accounts 132 that include an odd numbered bank identification number ("BIN") to a first scoring engine 608 and that directs second transaction messages 622 (e.g., authorization request messages) that pertain to cardholder accounts 132 that include an even numbered BIN to a second scoring engine 610. In some implementations, authorization system 601 is included in payment processing server computing device 202. In at least some implementations, the transaction messages 620 and 622 are real time (i.e., 101 transaction messages) or near real time (i.e., 102 transaction messages). First scoring engine 608 is coupled to a first database 612 and stores cardholder profiles, transaction histories, and fraud risk scores in first database 612, based at least in part on first transaction messages 620. Similarly, second scoring engine 610 is coupled to a second database 614 and stores cardholder profiles, transaction histories, and fraud risk scores in second database 614. Data is replicated between first database 612 and second database 614 through replication messages 634 transmitted between the two databases 612 and 614. In at least some implementations, database 208 (FIG. 2) includes one or more of first database 612 and second database 614.

Fraud risk scoring server 210 additionally includes a message processor 606 that transmits first non-financial request messages 616, such as demographics messages, to first scoring engine 608 and transmits second non-financial request messages 618, such as demographics messages, to second scoring engine 610. In at least some implementations, first non-financial request messages 616 and second financial request messages 618 are the same. First scoring engine 608 receives first profile update messages 624 (i.e., 108 messages) for transactions pertaining to even BINS and second scoring engine 610 receives second profile update messages 626 for transactions pertaining to odd BINS. Additionally, first scoring engine 608 accesses and updates first rules 628 for determining fraud risk scores for transactions (e.g., first transactions 620) and second scoring engine 610 accesses and updates second rules 630 for determining fraud risk scores for transactions (e.g., second transactions 622). Fraud risk scoring server 210 additionally includes a rule replicator 632 that replicates first rules 628 to second rules 630.

As described above, fraud risk scoring server 210 transmits calculated fraud scores from each of the first scoring engine 608 and the second scoring engine 610 to payment processing server computing device 202 of payment network 128. In some implementations, payment processing server computing device 202 determines that the calculated fraud score exceeds a predefined threshold value and declines the corresponding payment transaction without ever transmitting the authorization request message to the corresponding issuer 130. In some implementations, payment processing server computing device 202 transmits the fraud risk score to the issuer 130 along with the authorization request message, to inform the issuer 130 of the likelihood that the transaction is fraudulent. Given that the fraud risk scoring server 210 includes multiple sites 602 and 604 with respective scoring engines 608 and 610, the fraud risk scoring server 210 is more robust and reliable than if fraud risk scoring server 210 included only one site with one scoring engine. Additionally, fraud risk scoring server 210 is configured to perform a fallback ("failover") process to provide uninterrupted fraud risk scoring services in the event that one of the sites 602 and 604 becomes inoperable, for example due to maintenance, as described in more detail herein.

Figure 7:
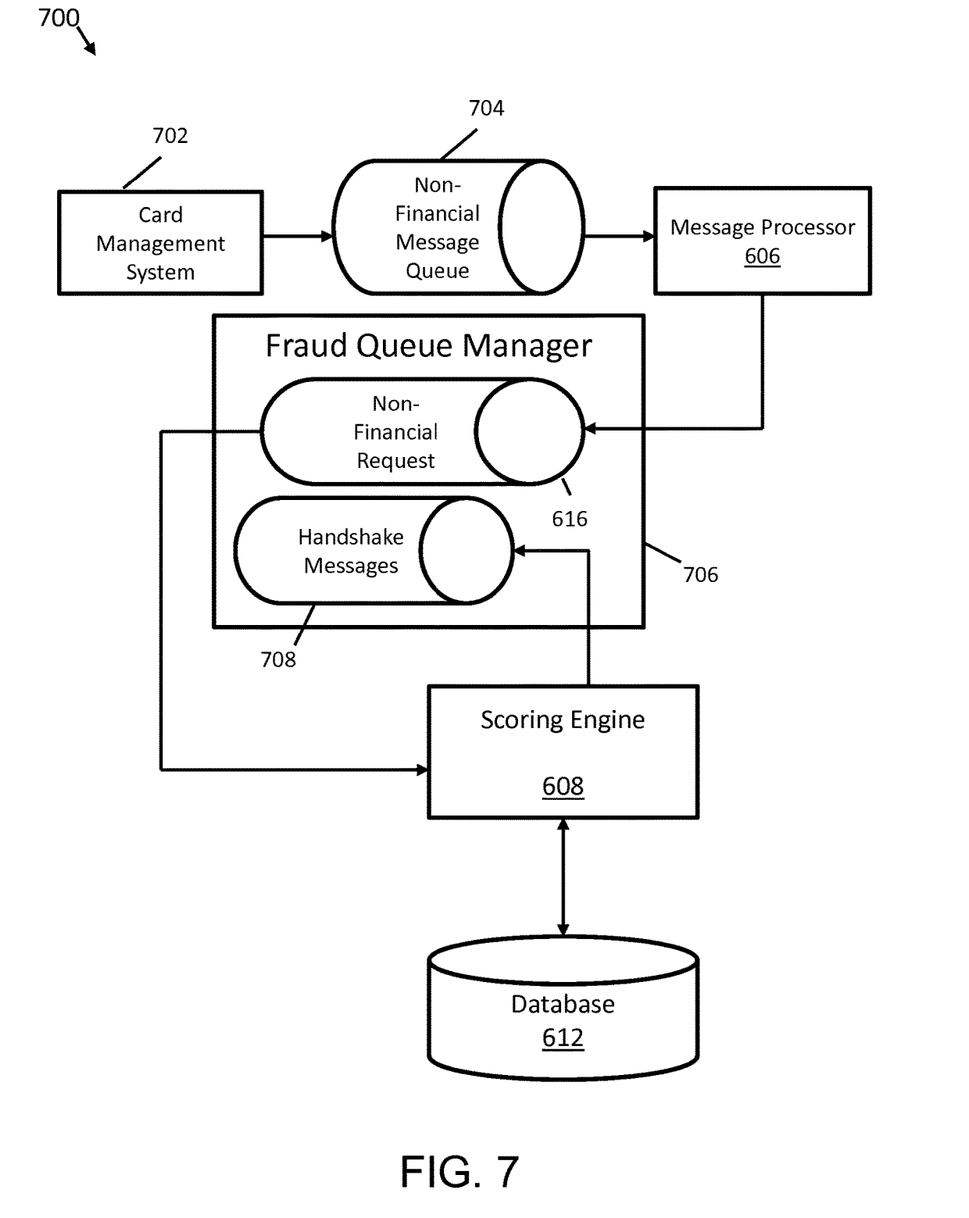
FIG. 7 is a data flow diagram for demographic and non-financial information processed and stored by the fraud risk scoring server.

FIG. 7 is a data flow diagram 700 for demographic and non-financial information processed and stored by the fraud risk scoring server 210. Fraud risk scoring server 210 uses the demographic and non-financial information to update cardholder profiles 916, which as described above, are used by fraud risk scoring server 210 to calculate fraud risk scores. A card management system 702, for example payment processing server computing device 202, transmits a non-financial message (e.g., first non-financial request 616) into a non-financial message queue 704. Message processor 606 transmits the non-financial request message 616 to a fraud queue manager 706. Fraud queue manager additionally receives one or more handshake messages 708 from first scoring engine 608 and transmits non-financial request 616 to first scoring engine 608, as described with reference to FIG. 6. Additionally, as described with reference to FIG. 6, first scoring engine 608 accesses and updates first database 612, based at least in part on the non-financial request message 616.

Figure 8:
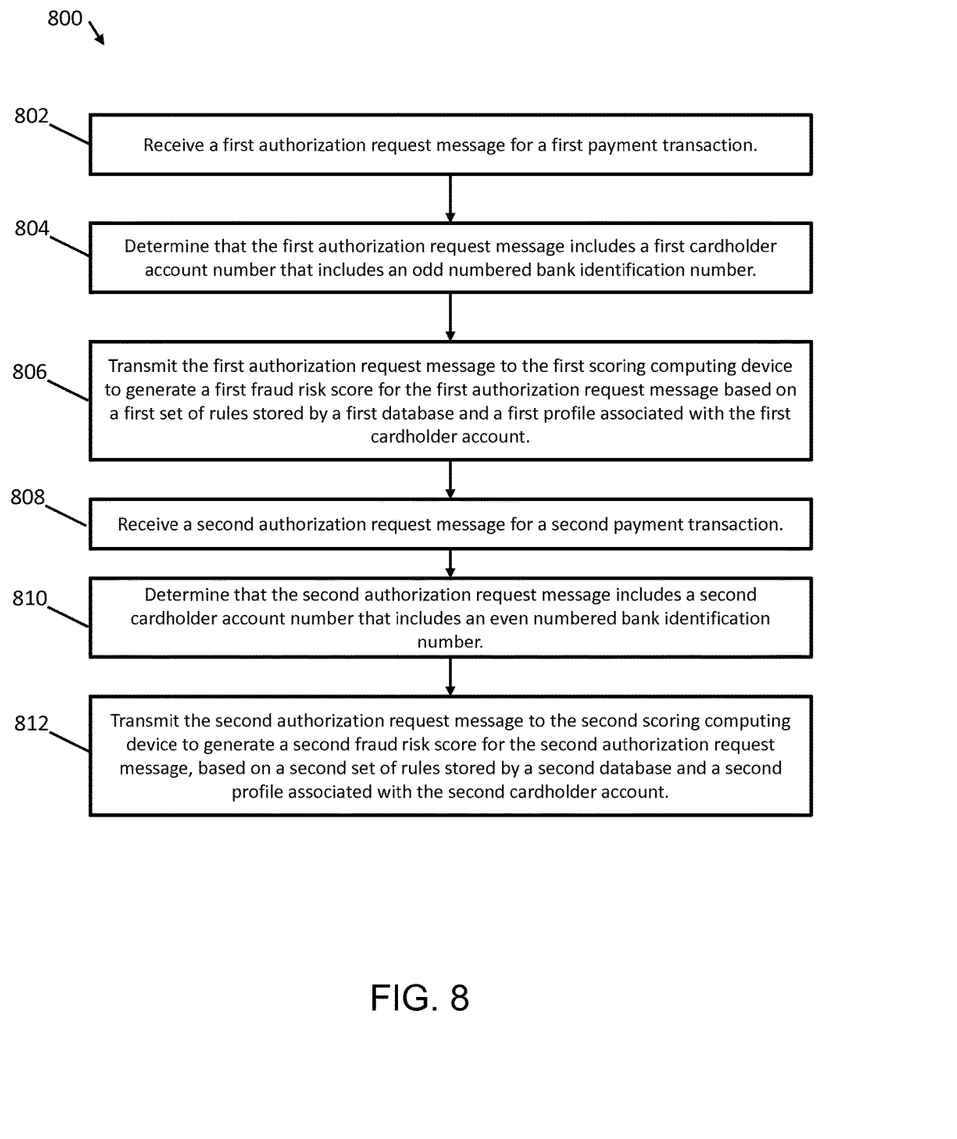
FIG. 8 is a flowchart of an example process implemented by the fraud risk scoring server for scoring electronic payment transactions for potential fraud in one example embodiment of the present disclosure.

FIG. 8 is a flowchart of an example process 800 implemented by fraud risk scoring server 210 for scoring electronic payment transactions for potential fraud. Fraud risk scoring server 210 receives 802 a first authorization request message for a first payment transaction (e.g., first transaction message 620). Additionally, fraud risk scoring server 210 determines 804 that the first authorization request message 620 includes a first cardholder account number 132 that includes an odd numbered BIN. Additionally, fraud risk scoring server 210 transmits 806 the first authorization request message 620 to the first scoring computing device (e.g., first scoring engine 608) to generate a first fraud risk score (e.g., fraud risk scores 920) for the first authorization request message 620 based on a first set of rules stored by a first database (e.g., first rules 628) and a first profile (e.g., profiles 916) associated with the first cardholder account 132.

Additionally, fraud risk scoring server 210 receives 808 a second authorization request message for a second payment transaction (e.g., second transaction message 622). Further, fraud risk scoring server 210 determines 810 that the second authorization request message 622 includes a second cardholder account number 132 that includes an even numbered BIN. Additionally, fraud risk scoring server 210 transmits 812 the second authorization request message to the second scoring computing device (e.g., second scoring engine 610) to generate a second fraud risk score 920 for the second authorization request message 622, based on a second set of rules stored by a second database (e.g., second rules 630) and a second profile 916 associated with the second cardholder account 132.

In some implementations, the fraud scoring system is further configured to generate, by the first scoring computing device (e.g., first scoring engine 608), a first profile update request message (e.g., profile update request message 624) to update the first profile (e.g., cardholder profiles 916) associated with the first cardholder account 132. Additionally, the fraud scoring system 210 transmits the first profile update request message 624 to the second scoring computing device (e.g., second scoring engine 610). Further the fraud scoring system generates 210, by the second scoring computing device (e.g., second scoring engine 610), a second profile update request message (e.g., profile update request message 626) to update the second profile (e.g., cardholder profiles 916) associated with the second cardholder account 132 and transmits the profile update request message 626 to the first scoring computing device 608.

In some implementations, the fraud risk scoring system 210 determines that the first scoring computing device 608 is not operating, and performs a fallback process. Specifically, the fraud risk scoring system 210 terminates any processes for replicating data between the first database 612 and the second database 614. Additionally, the fraud risk scoring system 210 generates profile update request messages associated with both odd and even numbered bank identification numbers at the second scoring computing device 610 and stores the profile update request messages 624 and 626 for processing by the first scoring computing device 608 when the first scoring computing device 608 is operational. Subsequently, the fraud risk scoring system 210 determines that the first scoring computing device 210 is operational and transmits all stored profile update request messages 624 and 626 from the second scoring computing device 610 to the first scoring computing device 608. Additionally, the fraud risk scoring system 210 synchronizes the second set of rules stored in the second database (e.g., second rules 630) with the first set of rules stored in the first database (e.g., first rules 628).

In some implementations, the authorization request messages 620 and 622 are real time or near real time authorization request messages. Additionally, in some implementations, the fraud risk scoring system 210 is configured to generate, by the first scoring computing device 608 and the second scoring computing device 610, authorization response messages for each respective authorization request message received. Additionally, the fraud risk scoring system 210 updates the corresponding cardholder profiles 916 based on the authorization request messages, and stores the updated cardholder profiles in the first database 612 and the second database 614.

In at least some implementations, the first scoring computing device 608 and the second scoring computing device 610 update the cardholder profiles 916 in response to profile update request messages 624 and 626 without storing the profile update request messages in the first database 612 or the second database 614. Additionally, in some implementations, the fraud risk scoring system 210 receives cardholder demographics and nonmonetary data 616 and 618 at the first scoring computing device 608 and the second scoring computing device 610, and updates cardholder profiles 916 using the received cardholder demographics and nonmonetary data 616 and 618.

The fraud risk scoring system 210, in some implementations, synchronizes rules between the first database 612 and the second database 614 by determining that the first rules 628 stored in the first database do not match the second rules 630 stored in the second database, and synchronizes the first rules 628 with the second rules 630. Additionally, in some implementations, the fraud risk scoring system 210 is configured to replicate data between the first database 612 and the second database 614 (e.g., replication messages 634) at a predefined interval.

Figure 9:
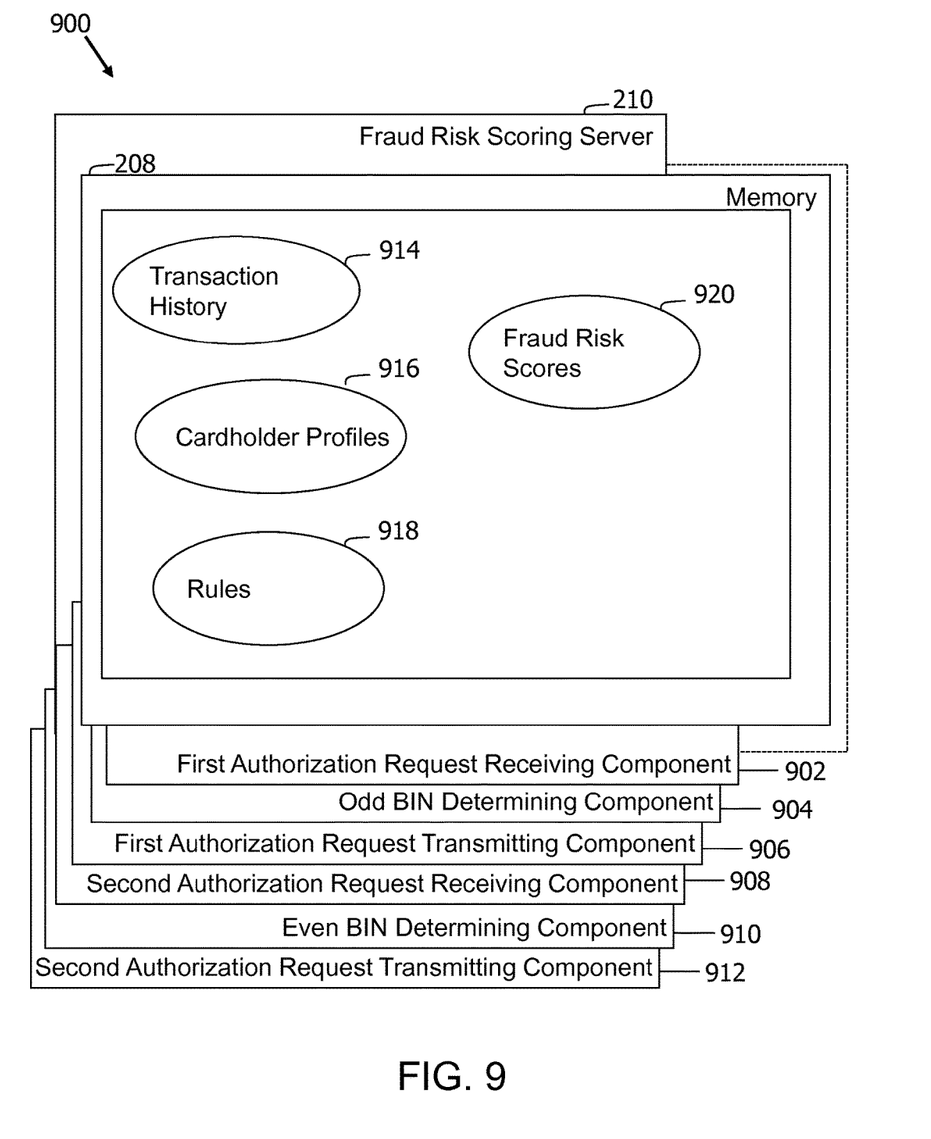
FIG. 9 is a diagram of components of one or more example computing devices that may be used in the system shown in FIG. 2.

FIG. 9 is a diagram 900 of components of one or more example computing devices, for example fraud risk scoring server 210, that may be used in embodiments of the described systems and methods. FIG. 9 further shows a configuration of data in database 208, which in at least some implementations, is representative of first database 612, first set of rules 628, second database 614, and second set of rules 630. Database 208 is in communication with several separate components within fraud risk scoring server 210, which perform specific tasks.

Fraud risk scoring server 210 includes a first authorization request receiving component 902 for receiving a first authorization request message for a first payment transaction. Additionally, fraud risk scoring server 210 includes an odd BIN determining component 904 for determining that the first authorization request message includes a first cardholder account number that includes an odd numbered bank identification number. Further, fraud risk scoring server 210 includes a first authorization request transmitting component 906 for transmitting the first authorization request message to the first scoring computing device to generate a first fraud risk score for the first authorization request message based on a first set of rules stored by a first database and a first profile associated with the first cardholder account. Additionally, fraud risk scoring server 210 includes a second authorization request receiving component 908 for receiving a second authorization request message for a second payment transaction. Fraud risk scoring server 210 also includes an even BIN determining component 910 for determining that the second authorization request message includes a second cardholder account number that includes an even numbered bank identification number. Additionally, fraud risk scoring server 210 includes a second authorization request transmitting component for transmitting the second authorization request message to the second scoring computing device to generate a second fraud risk score for the second authorization request message, based on a second set of rules stored by a second database and a second profile associated with the second cardholder account.

In an example embodiment, data in database 208 is divided into a plurality of sections, including but not limited to, a transaction history section 914, a cardholder profiles section 916, a rules section 918, and a fraud risk scores section 920. These sections stored in database 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described embodiments of a method and system provide a fraud risk scoring system that uses distributed processing to eliminate interruptions in determining whether electronic payment transactions are fraudulent. As a result, the methods and systems described herein enable an electronic payment processing network to provide highly robust and failure tolerant fraud scoring of electronic payment transaction signals to allow the payment processing network to determine whether a particular payment transaction is fraudulent while the transaction is being processed, rather than after a payment purchase has already been completed. More specifically, the systems and methods described herein enable the payment network to perform such fraud risk scoring even while maintenance is being performed on the fraud risk scoring system. By providing such highly reliable and robust fraud scoring, the systems and methods described herein enable a payment network infrastructure to operate more efficiently, by reducing the amount of additional transactions that would otherwise need to be transmitted and processed in order to correct (e.g., apply adjustments to) payment transactions that should have been declined due to fraud.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A co-processing fraud risk scoring system for scoring electronic payment transactions for potential fraud, said fraud risk scoring system comprising a message processor computing device in communication with a payment network, a first scoring computing device coupled to the message processor computing device, and a second scoring computing device coupled to the message processor computing device, said fraud risk scoring system configured to:
   receive a first authorization request message for a first payment transaction;
   determine that the first authorization request message includes a first cardholder account number that includes an odd numbered bank identification number;
   transmit the first authorization request message to the first scoring computing device to generate a first fraud risk score for the first authorization request message based on a first set of rules stored by a first database and a first profile associated with the first cardholder account;
   receive a second authorization request message for a second payment transaction;

determine that the second authorization request message includes a second cardholder account number that includes an even numbered bank identification number;

transmit the second authorization request message to the second scoring computing device to generate a second fraud risk score for the second authorization request message, based on a second set of rules stored by a second database and a second profile associated with the second cardholder account;

determine that the first scoring computing device is not operating;

terminate any processes for replicating data between the first database and the second database;

generate profile update request messages associated with both odd and even numbered bank identification numbers at the second scoring computing device and store the profile update request messages for processing by the first scoring computing device when the first scoring computing device is operational;

subsequently determine that the first scoring computing device is operational; and transmit all stored profile update request messages from the second scoring computing device to the first scoring computing device.

2. The co-processing fraud risk scoring system of claim 1, further configured to:

generate, by the first scoring computing device, a first profile update request message to update the first profile associated with the first cardholder account;

transmit the first profile update request message to the second scoring computing device;

generate, by the second scoring computing device, a second profile update request message to update the second profile associated with the second cardholder account; and transmit the profile update request message to the first scoring computing device.

3. The co-processing fraud risk scoring system of claim 1, further configured to:

synchronize the second set of rules stored in the second database with the first set of rules stored in the first database.

4. The co-processing fraud risk scoring system of claim 1, further configured such that transmitting the first authorization request message further comprises transmitting at least one of a real time and a near real time authorization request message to the first scoring computing device.

5. The co-processing fraud risk scoring system of claim 1, further configured to:

generate, by the first scoring computing device and the second scoring computing device, authorization response messages for each respective authorization request message received;

update corresponding cardholder profiles based on the authorization request messages; and store the updated cardholder profiles in the first database and the second database.

6. The co-processing fraud risk scoring system of claim 1, further configured such that the first scoring computing device and the second scoring computing device update cardholder profiles in response to profile update request messages without storing the profile update request messages in the first database or the second database.

7. The co-processing fraud risk scoring system of claim 1, further configured to:

receive cardholder demographics and nonmonetary data at the first scoring computing device and the second scoring computing device; and update cardholder profiles using the received cardholder demographics and nonmonetary data.

8. The co-processing fraud risk scoring system of claim 1, further configured to:

determine that the first rules stored in the first database do not match the second rules stored in the second database; and synchronize the first rules with the second rules.

9. The co-processing fraud risk scoring system of claim 1, further configured to replicate data between the first database and the second database at a predefined interval.

10. A method for scoring electronic payment transactions for potential fraud, said method is implemented by a co-processing fraud risk scoring system that includes a message processor computing device in communication with a payment network, a first scoring computing device coupled to the message processor computing device, and a second scoring computing device coupled to the message processor computing device, said method comprising:

receiving, by the co-processing fraud risk scoring system, a first authorization request message for a first payment transaction;

determining, by the co-processing fraud risk scoring system, that the first authorization request message includes a first cardholder account number that includes an odd numbered bank identification number;

transmitting, by the co-processing fraud risk scoring system, the first authorization request message to the first scoring computing device to generate a first fraud risk score for the first authorization request message based on a first set of rules stored by a first database and a first profile associated with the first cardholder account;

receiving, by the co-processing fraud risk scoring system, a second authorization request message for a second payment transaction;

determining, by the co-processing fraud risk scoring system, that the second authorization request message includes a second cardholder account number that includes an even numbered bank identification number;

transmitting, by the co-processing fraud risk scoring system, the second authorization request message to the second scoring computing device to generate a second fraud risk score for the second authorization request message, based on a second set of rules stored by a second database and a second profile associated with the second cardholder account;

determining that the first scoring computing device is not operating;

terminating any processes for replicating data between the first database and the second database;

generating profile update request messages associated with both odd and even numbered bank identification numbers at the second scoring computing device and store the profile update request messages for processing by the first scoring computing device when the first scoring computing device is operational;

subsequently determining that the first scoring computing device is operational; and transmitting all stored profile update request messages from the second scoring computing device to the first scoring computing device.

11. The method of claim 10, further comprising:
generating, by the first scoring computing device, a first profile update request message to update the first profile associated with the first cardholder account;
transmitting the first profile update request message to the second scoring computing device;
generating, by the second scoring computing device, a second profile update request message to update the second profile associated with the second cardholder account; and
transmitting the profile update request message to the first scoring computing device.

12. The method of claim 10, further comprising:
synchronizing the second set of rules stored in the second database with the first set of rules stored in the first database.

13. The method of claim 10, wherein transmitting the first authorization request message further comprises transmitting at least one of a real time and a near real time authorization request message to the first scoring computing device.

14. The method of claim 10, further comprising:
generating, by the first scoring computing device and the second scoring computing device, authorization response messages for each respective authorization request message received;
updating corresponding cardholder profiles based on the authorization request messages; and
storing the updated cardholder profiles in the first database and the second database.

15. The method of claim 10, further comprising updating cardholder profiles in response to profile update request messages without storing the profile update request messages in the first database or the second database.

16. The method of claim 10, further comprising:
receiving cardholder demographics and nonmonetary data at the first scoring computing device and the second scoring computing device; and
updating cardholder profiles using the received cardholder demographics and nonmonetary data.

17. The method of claim 10, further comprising:
determining that the first rules stored in the first database do not match the second rules stored in the second database; and
synchronizing the first rules with the second rules.

18. The method of claim 10, further comprising replicating data between the first database and the second database at a predefined interval.

19. A non-transitory computer-readable storage medium having computer-executable instructions embodied thereon, wherein when executed by a one or more processors of a co-processing fraud risk scoring system that includes a message processor computing device in communication with a payment network, a first scoring computing device coupled to the message processor computing device, and a second scoring computing device coupled to the message processor computing device, the computer-executable instructions cause the fraud risk scoring system to:
receive a first authorization request message for a first payment transaction;
determine that the first authorization request message includes a first cardholder account number that includes an odd numbered bank identification number;
transmit the first authorization request message to the first scoring computing device to generate a first fraud risk score for the first authorization request message based on a first set of rules stored by a first database and a first profile associated with the first cardholder account;
receive a second authorization request message for a second payment transaction;
determine that the second authorization request message includes a second cardholder account number that includes an even numbered bank identification number;
transmit the second authorization request message to the second scoring computing device to generate a second fraud risk score for the second authorization request message, based on a second set of rules stored by a second database and a second profile associated with the second cardholder account;
determine that the first scoring computing device is not operating;
terminate any processes for replicating data between the first database and the second database;
generate profile update request messages associated with both odd and even numbered bank identification numbers at the second scoring computing device and store the profile update request messages for processing by the first scoring computing device when the first scoring computing device is operational;
subsequently determine that the first scoring computing device is operational; and
transmit all stored profile update request messages from the second scoring computing device to the first scoring computing device.

20. The non-transitory computer-readable storage medium of claim 19, wherein said computer-readable instructions additionally cause the fraud risk scoring system to:
generate, by the first scoring computing device, a first profile update request message to update the first profile associated with the first cardholder account;
transmit the first profile update request message to the second scoring computing device;
generate, by the second scoring computing device, a second profile update request message to update the second profile associated with the second cardholder account; and
transmit the profile update request message to the first scoring computing device.

* * * * *